United States Patent Office 3,554,615
Patented Jan. 12, 1971

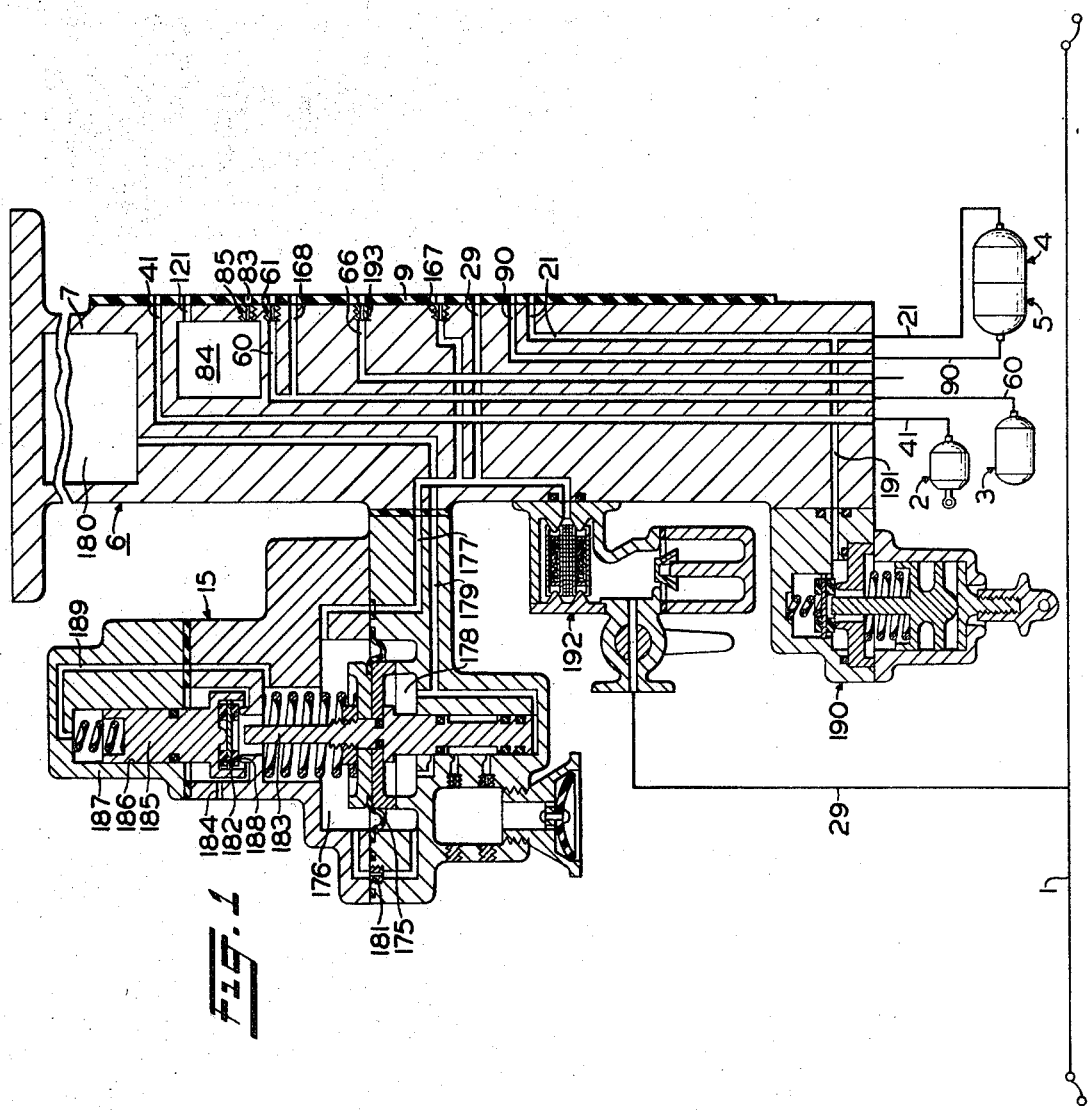

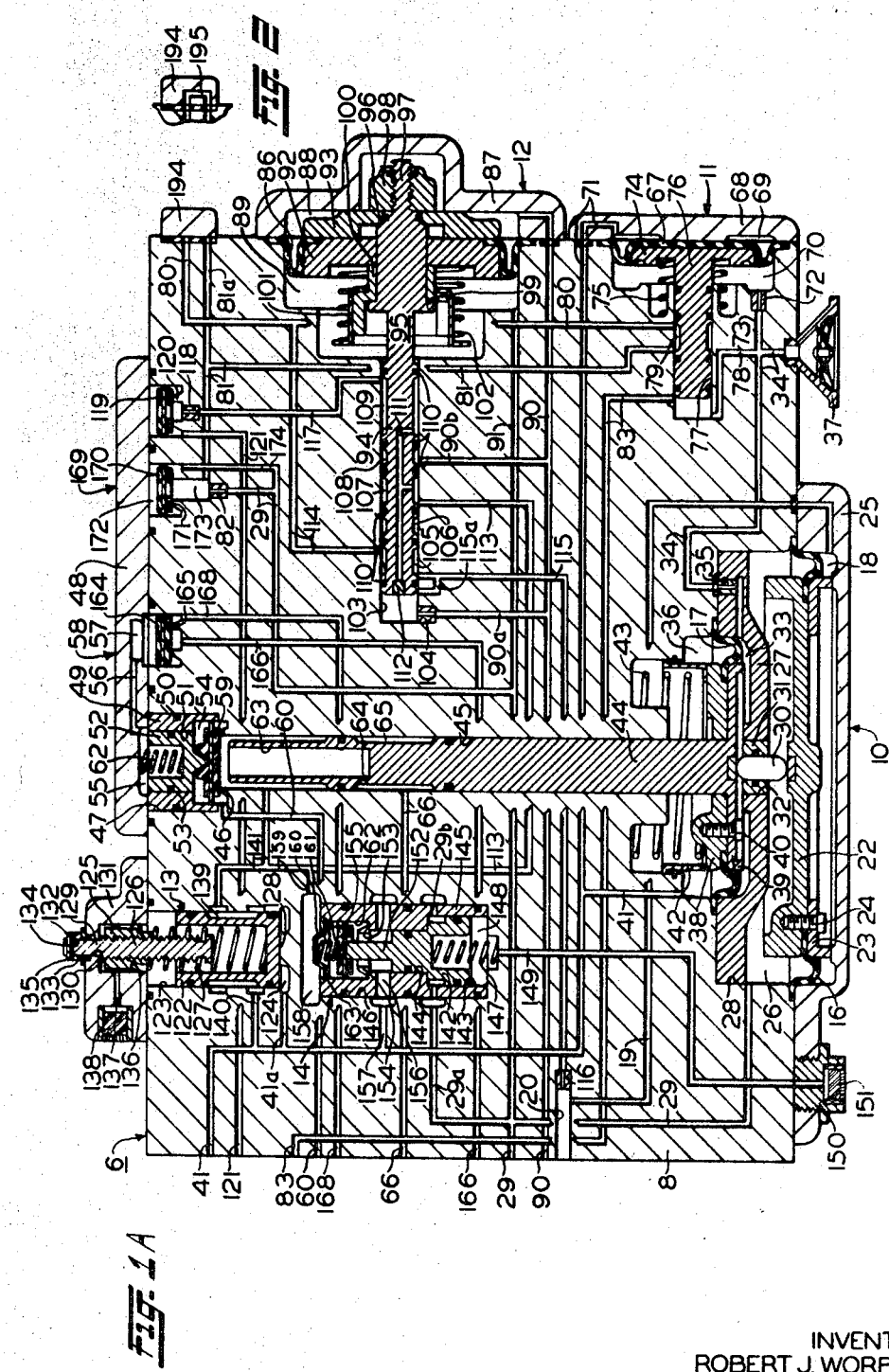

3,554,615
FLUID PRESSURE BRAKE CONTROL VALVE APPARATUS
Robert J. Worbois and James F. Ferguson, Irwin, and Richard L. Wilson, Monroeville, Pa., assignors to Westinghouse Air Brake Company, Wilmerding, Pa., a corporation of Pennsylvania
Filed Feb. 27, 1969, Ser. No. 802,930
Int. Cl. B60t 15/52
U.S. Cl. 303—36
7 Claims

ABSTRACT OF THE DISCLOSURE

A railway car brake control valve device having a combined quick service and selector valve means operative upon both a service and an emergency rate of reduction of pressure in a train brake pipe to establish a communication between a selector valve volume reservoir and a brake cylinder thereby insuring the same reduction of pressure in the selector valve volume reservoir as is effected in the train brake pipe for any brake pipe reduction not greater than that required to effect a full service brake application irrespective of the normally charged train brake pipe pressure, and further insuring equalization of pressure between the selector volume reservoir and the brake cylinder upon effecting in emergency brake application. This equalization of pressure between the selector valve volume reservoir and the brake cylinder provides that a full service brake application can always be maintained upon manual movement of the handle of an engineer's brake valve device to its suppression position subsequent to an automatically effected emergency brake application as the result of overspeed, an adverse signal indication or incapacitation of the engineer.

BACKGROUND OF THE INVENTION

Fluid pressure operated brake control valve devices presently in use on railway vehicles are provided with a combined quick service and selector valve means which is operative in response to either a service or an emergency rate of brake pipe pressure reduction to correspondingly reduce the pressure in a selector valve volume reservoir to a chosen lower pressure, which is less than the lowest normally fully charged train brake pipe pressure used on American railroads, and thereafter retain this chosen lower pressure in the selector valve volume reservoir nothwithstanding further reductions in brake pipe pressure thereby preventing unnecessary waste of fluid under pressure by completely depleting the selector valve volume reservoir and insuring that, upon recharging the brake pipe subsequent to effecting an emergency brake application, the combined quick service and selector valve means will be returned from its application to its release position.

The above-mentioned brake control valve device embodies therein a spring-loaded check valve device through which fluid under pressure from the selector valve volume reservoir is vented to atmosphere, upon movement of the combined quick service and selector valve means to an application position, until the aforestated chosen lower pressure in this reservoir is obtained.

At one time a railway car may be hauled in a train having a normally fully charged train brake pipe pressure of, for example, one hundred and ten pounds per square inch, and at another time this car may be hauled in a train having a normally fully charged train brake pipe pressure of, for example, seventy pounds per square inch. Accordingly, it is apparent that a single spring-loaded check valve device that retains the proper pressure in the selector valve volume reservoir when the car is hauled in one train is not capable of retaining the proper pressure in this reservoir when the car is hauled in the other train. To replace a check valve device suitable for use when the car is hauled in one train with another that is suitable for use when this car is hauled in the other train is impractical in view of the time required and expense to the railroad concerned. Furthermore, practical difficulties encountered in the manufacture of springs make it difficult, if not almost impossible, to obtain a large number of springs having identical deflection characteristics. It follows, therefore, that it is very unlikely that two check valve devices on two different cars would be operative to retain the exact same pressure in the respective selector valve volume reservoirs.

SUMMARY OF THE INVENTION

According to the present invention, there is provided a fluid pressure operated railway car brake control valve device of the type having a combined quick service and selector valve device that is operative upon both a service and an emergency rate of reduction of pressure in a train brake pipe to establish a communication between a selector valve volume reservoir, normally charged to the fully charged pressure of the train brake pipe, and a brake cylinder to insure that, for any train brake pipe pressure reduction not greater than that required to effect a full service brake application irrespective of the normally charged train brake pipe pressure, the pressure in the selector valve volume reservoir is reduced to the same pressure as that remaining in the train brake pipe subsequent to this reduction of pressure therein to effect the desired degree of brake application on the cars in a train. The establishment of this communication between the selector valve volume reservoir and the brake cylinder upon effecting an emergency brake application insures an equalization of pressure therebetween which thereby provides that a full service brake application can always be maintained upon manual movement of the handle of an engineer's brake valve device to its suppression position subsequent to an automatically effected emergency brake application on the locomotive and cars in a train resulting from overspeed of the train, an adverse wayside signal indication while traveling in train control territory, or incapacitation of the engineer.

In the accompanying drawings:

FIG. 1 and FIG. 1A, when taken together such that the right-hand edge of FIG. 1 is matched with the left-hand edge of FIG. 1A, constitute a diagrammatic view of a fluid pressure operated railway car brake control apparatus embodying the invention.

FIG. 2 is a fragmental view of an element of a brake control valve device constituting a part of the railway car brake apparatus shown in FIGS. 1 and 1A showing this element in a different position in which it converts the brake control valve device so as to operate as a direct release brake control valve device as distinguished from a graduated release brake control valve device.

Referring to the drawings, the fluid pressure operated railway car brake control apparatus embodying the invention comprises a brake pipe 1 that extends from end to end of the car, a brake cylinder 2, and auxiliary reservoir 3, a control reservoir 4, a selector volume reservoir 5, and a brake control valve device 6 connected to the brake pipe 1 and controlled by variations of pressure therein.

As shown in FIGS. 1 and 1A of the drawings, the brake control valve device 6 embodying the invention comprises a pipe bracket 7 (FIG. 1) to which is connected a branch of the usual brake pipe 1, the auxiliary reservoir 3, control resrvoir 4, selector volume reservoir 5, and the brake cylinder 2. Mounted on the right-hand face of the pipe bracket 7 is a sectionalized casing 8 (FIG. 1A) that is secured to the pipe bracket 7 by any suitable means (not shown), there being a sealing gasket 9 (FIG. 1) interposed between the pipe bracket 7 and sectionalized casing 8. The sectionalized casing 8 contains a service valve device 10, a combined charging and quick service cut-off valve device 11, a combined quick service and selector valve device 12, a service brake cylinder pressure limiting valve device 13, and an emergency brake cylinder pressure limiting valve device 14. Mounted on the left-hand face of the pipe bracket 7 is an emergency portion 15 (FIG. 1).

The service valve device 10 (FIG. 1A) comprises two coaxially arranged movable abutments or diaphragms 16 and 17 of different effective areas cooperatively, though not positively, connected so as to constitute a stack, as will be understood from subsequent description. The larger movable abutment 16 has at one side a chamber 18 that is constantly open to the control reservoir 4 via a passageway 19 that extends through the sectionalized casing 8 and opens at the wall surface of a counterbore 20 extending inward from the left-hand end of the sectionalized casing 8. Formed in the pipe bracket 7 and opening at one end into the counterbore 20 is one end of a passageway 21 that is connected by a pipe bearing the same numeral to the control reservoir 4.

A diaphragm follower 22 (FIG. 1A) is operatively connected to the center of the diaphgram 16 by means such as a diaphragm follower plate 23 and a plurality of cap screws 24, only one of which appears in FIG. 1A of the drawings, that pass through corresponding smooth bores in the diaphragm follower plate 23 and have screw-threaded engagement with coaxial screw-threaded bottomed bores in the diaphragm follower 22. The periphery of the diaphragm 16 is clamped between the bottom face of the sectionalized casing 8 and a cover 25 which is secured thereto by any suitable means (not shown). The diaphragm 16 cooperates with the sectionalized casing 8 and the cover 25 to form within the service valve device 10 and on the opposite sides of the diaphragm the chamber 18 and a chamber 26 that is formed by the cooperative relationship of the diaphragm 16, diaphragm follower 22, and an annular casing partition 27 that is disposed in a counterbore 28 formed in the sectionalized casing 8. The chamber 26 is constantly open to the brake pipe 1 via a passageway 29 that extends through the sectionalized casing 8 and the pipe bracket 7 and is connected by a pipe bearing the same numeral to the brake pipe 1. A cylindrical pusher stem 30 arranged coaxially with the movable abutments 16 and 17 has sealing, slidably guided contact with the wall of an aligned bore through a bushing 31 that is press-fitted into a bore 32 formed in the annular casing partition 27 and coaxial with the diaphragms 16 and 17. The annular casing partition 27 separates the chamber 26 from an atmospheric chamber 33 that is open to the atmosphere via a passageway 34 that extends through the sectionalized casing 8 and the annular casing partition 27. That portion of the passageway 34 formed in the annular casing partition 27 has disposed therein a choke 35, the purpose of which is to control the rate of flow of fluid under pressure from a chamber 36 formed above the diaphragm 17 should the diaphragm 17 become ruptured. That end of the passageway 34, opposite the end adjacent choke 35, is open to atmosphere through an insect excluder device 37 which may be of the usual construction. The chamber 36 is formed by the cooperative relation of the sectionalized casing 8, the diaphragm 17, and a diaphragm follower plate 38 to which a diaphragm follower 39 is secured by a plurality of cap screws 40, only one of which appears in FIG. 1A of the drawings, these cap screws serving to clamp the inner periphery of the diaphragm 17 between the diaphragm follower plate 38 and the diaphragm follower 39. Opening into the chamber 36 is one end of a passageway 41 that extends through the sectionalized casing 8 and the pipe bracket 7 and is connected by a pipe bearing the same numeral to the brake cylinder 2. Disposed within the chamber 36, between the casing section 8 and a hollow spring seat 42, is a spring 43 for biasing the spring seat 42 against the diaphragm follower plate 38 and thereby biasing the diaphragm 17 and the diaphragm follower 39, which has formed integral therewith a valve stem 44, in a downward direction. The valve stem 44 extends through a bore 45 formed in the sectionalized casing 8. The bore 45 opens at its lower end into the chamber 36 and has formed at its upper end an annular valve seat 46. The sectionalized casing 8 is provided with a counterbore 47 that is coaxial with the annular valve seat 46. Disposed in the counterbore 47, the outer end of which is closed by a cover 48 secured to the sectionalized casing 8 by any suitable means (not shown), is a bushing 49 having a groove in the periphery thereof, in which groove is carried an O-ring 50 to prevent leakage of fluid under pressure along the counterbore 47 between the bushings 49 and the wall of the counterbore 47 in the sectionalized casing 8. The bushing 49 is provided with a bore 51 in which is slidably mounted a piston 52 that is provided with a peripheral annular groove in which is disposed an O-ring 53 to prevent leakage of fluid under pressure from a chamber 54 below the piston to a chamber 55 above the piston, which chamber 55 is connected by a passageway 56 in the cover 48 to an outlet chamber of an auxiliary reservoir charging check valve device 58 hereinafter described in detail.

Fluid under pressure supplied through the auxiliary reservoir charging check valve device 58, in a manner hereinafter described, will flow through the passageway 56 to the chamber 55 and act on top of the piston 52 to balance the pressure acting on a flat disc-type valve 59 disposed in the chamber 54 when the flat disc-type valve 59 is unseated from the annular valve seat 46, since the chamber 54 is constantly supplied with fluid under pressure from the auxiliary reservoir 3 via a pipe and corresponding passageway 60 that extends through the pipe bracket 7 and sectionalized casing 8 and has disposed therein a service choke 61 carried by the pipe bracket 7. A spring 62 is interposed between the cover 48 and the upper side of the piston 52 to bias this piston and the flat disc-type valve 59 downward, so that the valve 59 is moved into contact with the annular valve seat 46 except when unseated therefrom, in a manner hereinafter described.

The upper end of the stem 44 is provided with a portion of reduced diameter into which extends a counterbore 63, the bottom of which is opened via a radial port 64 to a peripheral annular groove 65 formed on the stem 44. While the stem 44 occupies the position in which it is shown in FIG. 1A, the interior of the counterbore 63 is connected via the port 64 and peripheral annular groove 65 to a passageway 66 which extends through the sectionalized casing 8 and the pipe bracket 7 and has one end open at the wall surface of the bore 45 and the other end open to the exterior of the pipe bracket 7.

The combined charging and quick service cut-off valve device 11 comprises a movable abutment 67, the outer periphery of which is clamped between the sectionalized casing 8 and a cover 68. The diaphragm 67 cooperates with the sectionalized casing 8 and the cover 68 to form on opposite sides of the diaphragm two chambers 69 and 70. The chamber 69 is connected via a passageway 71 extending through the cover 68 and the sectionalized casing 8 to the passageway 41 in the sectionalized casing 8, and the chamber 70 is constantly open via a choke 72 and a passageway 73 extending through the sectionalized casing 8 to the passageway 34 therein which is connected to atmosphere via the insect excluder device 37, as hereinbefore explained. Disposed in the chamber 70 and interposed between the sectionalized casing 8 and a diaphragm follower 74 is a spring 75 that surrounds a spool-type charging and quick service cutoff valve 76 that is formed integral with the diaphragm follower 74 and is slidably mounted in a bottomed bore 77 formed in the sectionalized casing 8, the open end of said bottomed bore opening into the chamber 70. The opposite end of the bottomed bore 77 is open to atmosphere via a passageway 78 extending through the sectionalized casing 8 to the passageway 34 which, as herein before stated, is open to atmosphere via the insect excluder device 37. When pressure in the chamber 69 is less than a chosen value, the spool-type charging and quick service cut-off valve 76 will be biased by the spring 75 to a charging position, in which it is shown in FIG. 1A of the drawings. With the spool-type charging and quick service cut-off valve 76 in this position, a peripheral annular groove 79 formed thereon connects a passageway 80 in the sectionalized casing 8 with a passageway 81 that is also in this sectionalized casing. The passageway 81 is supplied with fluid under pressure from the brake pipe 1 via the pipe and corresponding passageway 29 and a control reservoir slow charging choke 82. While the charging and quick service cut-off valve 76 occupies the position in which it is shown in FIG. 1A, the left-hand end thereof uncovers one end of a passageway 83 formed in the sectionalized casing 8 and the pipe bracket 7, the opposite end of which passageway opens into a quick service volume 84 (FIG. 1) formed in the pipe bracket 7, this passageway 838 having therein a continued quick service reduction choke 85, which choke is carried by the pipe bracket 7.

The combined quick service and selector valve device 12 comprises a movable abutment or diaphragm 86, the outer periphery of which is clamped between the sectionalized casing 8 and a cup-shaped cover 87. The diaphragm 86 cooperates respectively with the sectionalized casing 8 and the cover 87 to form on opposite sides of the diaphragm two chambers 88 and 89. The chamber 88 is open via a passageway 90 extending through the sectionalized casing 8 and the pipe bracket 7 and a pipe bearing the same numeral to the selector volume reservoir 5, and the chamber 89 is connected via a passageway 91 extending through the casing section 8 to the hereinbefore-mentioned passageway 29 therein.

The inner periphery of the diaphrgam 86 is clamped between a diaphragm follower 92 and a diaphragm follower plate 93, each of which has a central bore. Coaxially attached to the diaphragm 86 is a spool-type combined quick service and selector valve 94 having at its right-hand end a stem 95 that extends into the chamber 89. The stem 95 is provided with a stepped portion that extends through the bore in the diaphragm follower plate 93 which rests against a shoulder 96 formed at the left-hand end of the stepped portion. This stepped portion of the stem 95 has extending therefrom a screw-threaded portion 97 with which a nut 98 has screw-threaded engagement to secure the diaphragm follower plate 93 against the shoulder 96. The stem 95 is provided with a collar 99 between which and the diaphragm follower 92 is disposed a sleeve-like strut 100 having at its left-hand end an outturned cup-like annular flange against the right-hand side of which rests an inturned flange formed at one end of a spring seat 101 that is provided at its opposite end with an outturned annular flange. Disposed in surrounding relation to the sleeve-like strut 100 and interposed between the diaphragm follower 92 and the outturned annular flange on the spring seat 101 is a spring 102 which is effective to normally urge the inturned flange on the spring seat 101 toward and into contact with the outturned cup-like flange on the strut 100, it being noted that the spring seat 101 extends in the direction of the left-hand beyond the left-hand end of the outturned cup-like annular flange on strut 100.

The combined quick service and selector valve 94 is slidably disposed in a bottomed bore 103 extending into the sectionalized casing 8 from the chamber 89. The left-hand end of the bottomed bore 103 is open via a selector volume charging choke 104 to a first branch passageway 90a of the hereinbefore-mentioned passageway 90 in the sectionalized casing 8.

The spool-type combined quick service and selector valve 94 has five spaced-apart elongated peripheral annular grooves 105, 106, 107, 108 and 109 formed thereon. Between the adjacent ends of these elongated peripheral annular grooves, and also adjacent the left-hand end of the elongated groove 105 and the right-hand end of the elongated groove 109, the spool-type combined quick service and selector valve 94 has a peripheral annular groove in each of which is disposed an O-ring 110.

The spool-type combined quick service and selector valve 94 is provided with a central bottomed bore 111 extending inward from the left-hand end thereof, which bottomed bore is constantly open via suitable radial ports to the elongated peripheral annular grooves 107 and 109. The left-hand end of the bottomed bore 111 is closed by a plug 112 press-fitted thereinto.

While the combined quick service and selector valve 94 occupies the position in which it is shown in FIG. 1A of the drawings, the peripheral annular groove 107 thereon is in registry with one end of a passageway 113 that opens at the wall surface of the bottomed bore 103. This passageway 113 extends through the sectionalized casing 8 to the hereinbefore-mentioned emergency brake cylinder pressure limiting valve device 14 disposed in this casing section 8 and hereinafter described in detail.

When the combined quick service and selector valve 94 is moved, in a manner hereinafter described in detail, from the position in which it is shown in FIG. 1A to a second position, a second branch passageway 90b of the passageway 90 is connected to the passageway 113 via the peripheral annular groove 109, bottomed bore 111 and the peripheral annular groove 107.

Also, while the combined quick service and selector valve 94 occupies the position in which it is shown in FIG. 1A, the peripheral annular groove 105 therein establishes a communication between two passageways 114 and 115 formed in the sectionalized casing 8, one end of each of which passageways opens at the wall surface of the bottomed bore 103 between the ends of the groove 105. The other end of the passageway 114 opens into the hereinbefore-mentioned passageway 80 in the sectionalized casing 8 intermediate the ends of this passageway, and the other end of the passageway 115 opens via an overcharge dissipation choke 116 into the hereinbefore-mentioned counterbore 20. The passageway 115 has a branch passageway 115a that opens at the wall surface of the bottomed bore 103 intermediate the locations at which the selector volume charging choke 104 and the above-mentioned one end of the passageway 115 opens at the wall surface of the bottomed bore 103.

Furthermore, while the spool-type combined quick service and selector valve 94 occupies the position in which it is shown in FIG. 1A, the peripheral annular groove 109 thereon is in a position in which the O-ring 110 adjacent the right-hand end thereof forms a seal with the wall surface of the bottomed bore 103 to close communication between a passageway 117 in the sectionalized casing 8, one end of which opens at the wall surface of the bottomed bore 103, and the chamber 89. The opposite end of the passageway 117 is open via a quick service reduction choke 118 to the inner seated area of a flat disc-type check valve 119 that normally rests against an annular valve seat 120. The outlet side of the flat disc-type check valve 119 is connected via a passageway 121 extending through the sectionalized casing 8 and the pipe bracket 7 to the hereinbefore-mentioned quick service volume 84.

The service brake cylinder limiting valve device 13 comprises a movable abutment in the form of a cup-shaped cylindrical piston member 122 that is slidably mounted in a counterbore 123 formed in the sectionalized casing 8 and is subject to fluid under pressure in a chamber 124 therebelow, into which chamber opens one end of a branch passageway 41a of the passageway 41 in the sectionalized casing 8. Interposed between the upper side of the cup-shaped cylindrical piston member 122 and a nut 125 that has screw-threaded engagement with a screw-threaded rod 126 is a spring 127 which is effective to normally bias the piston member 122 against a stop 128 formed integral with the sectionalized casing 8. The upper end of the screw-threaded rod 126 is provided with a stem 129, the diameter of which is less than that of the rod. The stem 129 extends through a bore 130 in a cover member 131 and a coaxial bore 132 of the same diameter in a sleeve member 133 that is locked in place by a pin 134 that extends through a crosswise bore 135 adjacent the upper end of the stem 129, which pin has its opposite ends overlying the upper end of the sleeve member 133. The upper end of the counterbore 123 is open to atmosphere via a coaxial counterbore 136, a passageway 137 formed in the cover member 131 and an insect excluder device 138 carried by the cover member.

The cup-shaped cylindrical piston member 122 is provided with an elongated peripheral annular groove 139 which, while the piston member 122 occupies the position in which it is shown in FIG. 1A, establishes a communication between two passageways 140 and 141 formed in the sectionalized casing 8, each of which has one end opening at the wall surface of the counterbore 123. The opposite end of the passageway 140 opens into the hereinbefore-mentioned passageway 41, and the opposite end of the passageway 141 opens at the wall surface of the bore 45.

The emergency brake cylinder limiting valve device 14 may comprise a movable abutment in the form of a differential piston member 142 slidably mounted in two concentric counterbores 143 and 144 of unequal diameter formed in a bushing 145 that is press-fitted into a counterbore 146 formed in the sectionalized casing 8. That portion of the differential piston member 142 that is slidably mounted in the counterbore 143 is subject on its upper side to the pressure of the fluid in the brake pipe 1, which fluid under pressure is supplied thereto via a branch passageway 29a of the hereinbefore-mentioned passageway 29 and a plurality of arcuately spaced ports 29b in the bushing 145, and on its lower side to the force of a spring 147 disposed in a chamber 148 that is open to atmosphere via a passageway 149 extending through the sectionalized casing 8, a screw-threaded plug 150 carried by the cover 25 and an insect excluder device 151 carried by the plug 150. Formed integral with the differential piston member 142 is a stem 152 that extends through a bore 153 in the bushing 145, which bore is coaxial with the counterbores 143 and 144 in this bushing and at the upper end of which bore 153 is formed an annular valve seat 154.

While the differential piston member 142 occupies the position in which it is shown in FIG. 1A of the drawings, the stem 152 is effective to maintain a flat disc-type valve 155 out of seating contact with the valve seat 154 to thereby establish a communication between the interior of the counterbore 144, which is connected to the passageway 41 via plurality of arcuately-spaced ports 156 formed in the bushing 145 and a passageway 157 in the sectionalized casing 8, and a chamber 158 into which opens one end of a passageway 159 the opposite end of which opens into the hereinbefore-mentioned passageway 141 and into which passageway 159 intermediate the ends thereof opens the other end of the hereinbefore-mentioned passagway 113 extending through the sectionalized casing 8 the one end of which passageway 113 opens at the wall surface of the bottomed bore 103, as hereinbefore stated.

Interposed between the flat disc-type valve 155 and a spring seat 160 is a spring 161 for biasing the valve 155 toward the annular valve seat 154 and into contact with the upper end of the stem 152. The spring seat 160 is retained in a counterbore 162 formed in the upper end of the bushing 145 by a snap ring 163 that is inserted in a groove in the counterbore 162.

The hereinbefore-mentioned auxiliary reservoir charging check valve device 58 (FIG. 1A) comprises a flat disc-type valve 164 that normally has seated contact with an annular valve seat 165 formed adjacent one end of a passageway 166 in the sectionalized casing 8, the opposite end of which is connected through an auxiliary reservoir charging choke 167 (FIG. 1) carried by the pipe bracket 7 to a branch of the hereinbefore-mentioned passageway 29 in the pipe bracket, which passageway is constantly connected to the brake pipe 1, as hereinbefore explained. Therefore, upon build-up of pressure in the brake pipe 1, the flat disc-type valve 164 is moved away from the annular valve seat 165 to permit a one-way flow of fluid under pressure from the passageway 166 to the hereinbefore-mentioned outlet chamber 57. The outlet chamber 57 is in constant communication with the auxiliary reservoir 3 by way of a passageway 168 that extends through the sectionalized casing 8 and the pipe bracket 7 to the hereinbefore-mentioned passageway 60 which is connected by a pipe bearing the same numeral to the auxiliary reservoir 3.

The brake control valve device 6 further includes a control reservoir dissipation check valve device 169 that is connected in by-passing relation to the hereinbefore-mentioned control reservoir slow charging choke 82. The control reservoir dissipation check valve device 169 comprises a flat disc-type valve 170 that normally has seated contact with an annular valve seat 171 to close communication between a chamber 172 and a chamber 173 to which fluid under pressure is supplied from the brake pipe 1 at a rate controlled by the size of the control reservoir slow charging choke 82 and from which chamber 173 fluid under pressure flows to the combined charging and quick service cut-off valve device 11 via the passageway 81 that extends from the chamber 173 to the opening of one end thereof at the wall surface of the bottomed bore 77. Opening into the chamber 172 is one end of a passage 174 the opposite end of which opens into the passageway 29 on the brake pipe side of the control reservoir slow charging choke 82.

Briefly, the emergency portion 15 (FIG. 1) of the brake control valve device 6 comprises a diaphragm 175 having at one side a chamber 176 that is open to the brake pipe 1 via a passageway 177 one end of which opens into the chamber 176 and the opposite end of which opens into the passageway 28 intermediate the ends thereof. The diaphragm 175 has at the opposite side thereof a chamber 178 that is connected via a passageway 179 to a quick action chamber 180 in the pipe bracket 7, which chamber 178 is charged from the chamber 176 via a quick action chamber charging choke 181.

Arranged coaxially with the diaphragm 175 is a preferably disc-shaped brake pipe vent valve 182 which is adapted to be unseated by a stem 183 operatively connected to the diaphragm 175 upon an emergency rate of reduction in brake pipe pressure present in the chamber 176 above the diaphragm, whereupon the fluid under pressure present in the chamber 176 is vented to atmosphere via a port 184 at a rapid rate to hasten the propagation of an emergency rate of reduction in brake pipe pressure from car to car through a train.

The above-mentioned brake pipe vent valve 182 of the emergency portion 15 has a cylindrical stem 185 integral therewith and slidably mounted in a bottom bore 186 provided in a casing section 187 of the sectionalized casing of the emergency portion 15.

In order to provide for balancing the valve 182 and the cylindrical stem 185 while the valve 182 is unseated from a seat 188, the chamber 176 is connected to the upper end of the bottomed bore 186 via a passageway 189.

In order to release fluid under pressure from the control reservoir 4, a manually operated control reservoir release valve device 190 is secured to the left-hand side of the pipe bracket 7 and is connected to the passageway 21 in the pipe bracket 7 by a passageway 191.

Also secured to the left-hand side of the pipe bracket 7 by any suitable means (not shown) is a combined brake pipe-cutout cock and strainer device 192. One end of the passageway 29 in the pipe bracket 7 opens into this combined cut-out cock and strainer device 192 and one end of the corresponding pipe 29 is connected to this strainer device the opposite end of which pipe is connected to the brake pipe 1, as hereinbefore explained.

Assume that all the passageways and chambers in the brake control valve device 6, shown in FIGS. 1 and 1A of the drawings, are devoid of fluid under pressure, that the various parts of the brake control valve devise 6 are in the respective positions in which they are shown in the drawings, that the brake control valve device 6 is the brake control valve device on any car in a train, and that it is desired to initially charge the brake equipment on all the cars in the train to one end of which it may be assumed a locomotive is coupled, it being also assumed that the brake pipe on the locomotive is connected to the train brake pipe extending from car to car through the train.

To effect initial charging of the brake equipment on all the cars in the train, the engineer will move the handle of the automatic brake valve device (not shown) on the locomotive to its running (i.e. release) position. Movement of this handle to its running position effects the supply of fluids under pressure o the brake pipe 1 from whence it will flow to the inner seated area of the flat disc-type valve 164 via pipe and corresponding passageway 29, auxiliary reservoir charging choke 167 and passageway 166. Fluid under pressure thus supplied from the brake pipe 1 to the inner seated area of the flat disc-type valve 164 is effective to unseat this valve from its annular valve seat 165. When the flat disc-type valve 164 is thus unseated from the annular valve seat 165, fluid under pressure will flow from the passageway 166 to the outlet chamber 57 and thence at an unrestricted rate through the passageway 168 to the passageway 60 in the pipe bracket 7, which passageway 60 is connected by the corresponding pipe to the auxiliary reservoir 3. Fluid under pressure is thus supplied via the automatic brake valve device, the brake pipe 1 and brake control valve device 6 to the auxiliary reservoir 3 until the pressure therein is substantially the same as the normal fully charged pressure carried in the brake pipe 1, which, for example, may be any pressure from 70 to 110 pounds per square inch inclusive.

The fluid under pressure supplied to the outlet chamber 57 also flows through the passageway 56 in the cover 48 to the chamber 55 above the piston 52. Fluid under pressure flows from the auxiliary reservoir 3 via the pipe and passageway 60 to the chamber 54 below the piston 52 so that the pressures acting on the opposite sides of this piston are equal. Therefore, the flat disc-type valve 59 is biased into contact with the annular valve seat 46 by the force of the comparatively light spring 62 and the fluid under pressure acting on the upper side of the flat disc-type valve 59 over an area equal to the area of the annular valve seat 46.

Fluid under pressure that is supplied from the brake pipe 1 to the passageway 29 in the pipe bracket 7 will also flow through that portion of this passageway 29 in the sectionalized casing 8 to the chamber 26 above the diaphragm 16 so that the pressure in the chamber 26 is increased to the normal value of the pressure carried in the brake pipe 1 when fully charged.

Fluid under pressure that is supplied from the brake pipe 1 to the passageway 29 in the pipe bracket 7 and the sectionalized casing 8 also flows therefrom through control reservoir slow charging choke 82, chamber 173, passageway 81, peripheral annular groove 79 formed on the charging and quick service cutoff valve 76, thence via the passageways 80 and 114, peripheral annular groove 105 formed on the spool-type combined quick service and selector valve 94, passageway 115, overcharge dissipation choke 116, counterbore 20 and passageway and corresponding pipe 21 to control reservoir 4 to effect charging of the control reservoir from the brake pipe 1 until the pressure in the control reservoir 4 is substantially the same as the normal fully charged pressure carried in the brake pipe 1, which, for example, as hereinbefore stated, may be any pressure from 70 to 110 pounds per square inch inclusive. Fluid under pressure supplied to the counterbore 20, in the manner just described, also flows therefrom via the passageway 19 to the chamber 18 below the diaphragm 16 so that this chamber is charged simultaneously with the control reservoir 4. Fluid under pressure supplied to the passageway 115, in the manner explained above, flows therefrom via the branch passageway 115a to the interior of the bottom bore 103 and thence via the selector volume charging choke 104, branch passageway 90a, and passageway 90 and the pipe bearing the same numeral to the selector volume 5 to effect charging of this reservoir to the same pressure as that in the brake pipe. The fluid under pressure supplied to the passageway 90 also flows to the chamber 88 on the right-hand side of the diaphragm 86. The fluid under pressure that is supplied from the brake pipe 1 to the passageway 29 extending through the pipe bracket 7 and the sectionalized casing 8 flows from this passageway 29 via the passageway 91 to the chamber 89 so that this chamber is charged substantially simultaneously with the chamber 88 on the opposite side of the diaphragm 86.

Fluid under pressure also flows from the passageway 29 in the sectionalized casing 8 via the branch passageway 29a and ports 29b in the bushing 145 to the interior of the counterbore 143 above the larger piston of differential piston member 142. Fluid under pressure thus supplied to the interior of the counterbore 143 is effective to move the differential piston member 142 downward against the yielding resistance of the spring 147 until the lower end of the differential piston member abuts the bottom of the counterbore 146. As the differential piston member 142 is thus moved downward in response to an increase in brake pipe pressure, the stem 152 is likewise moved downward thereby rendering spring 161 effective to move the flat disc-type valve 155 into seating contact with the annular valve seat 154 to close communication between the chamber 158 and the interior of the counterbore 144.

After the lapse of a period of time necessary to effect charging of the auxiliary reservoir 3, the control reservoir 4, and the selector volume reservoir 5, and the various chambers in the brake control valve device 6 on the cars in the train, the pressure of the fluid in the brake pipe 1 will be stabilized by the setting of the self-lapping control valve device (not shown) of the automatic brake valve device at a normal value of such as, for example, 70 pounds per square inch, preparatory to operation of the brake control valve devices on all the cars in the train to effect a brake application.

During such initial charging of the brake control valve device 6, the brake cylinder device 2 will remain vented to atmosphere via the pipe and corresponding passageway 41 that extends through the pipe bracket 7 and the casing 8, passageway 140, elongated peripheral annular groove 139 on the cup-shaped cylindrical piston member 122 of the service brake cylinder limiting valve device 13, passageway 141, upper end of the bore 45, counterbore 63 and port 64 in the stem 44, peripheral annular groove 65 formed on the stem 44, and the exhaust passageway 66 which opens at one end at the wall surface of the bore 44 intermediate the ends of the peripheral annular groove 65 on the stem 44 and at the other end to the exterior of the pipe bracket 7 and has disposed therein a brake cylinder release choke 193 (FIG. 1) which is carried by the pipe bracket 7.

Since the chamber 124 is connected by the branch passageway 41a to the passageway 41 which is open to the atmosphere, as has just been explained, the chamber 124 will therefore be at atmospheric pressure. Consequently, spring 127 is therefore effective to bias the piston member 122 against the stop 128, in which position the peripheral annular groove 139 on the piston member 122 establishes a communication between the passageway 140 and the passageway 141.

To effect a graduated service application of the brakes, the engineer will move the handle of the automatic brake valve device from its running position to a selected position in its service zone corresponding to the degree of brake application desired to effect a reduction in the pressure in the brake pipe 1 at a service rate. Such reduction in brake pipe pressure will occur in chamber 89 of the combined quick service and selector valve device 12 of the brake control valve device 6 since chamber 89 is connected to the brake pipe 1 via passageway 91 and passageway and corresponding pipe 29. When brake pipe pressure has been reduced a slight degree such as, for example, 0.8 pound per square inch, in the chamber 89, the diaphragm 86 will be deflected in the direction of the left hand, as viewed in FIG. 1A, by the preponderant selector volume reservoir pressure present in the chamber 88 which is connected to the selector volume reservoir 5 via the passageway and corresponding pipe 90. This deflection of the diaphragm 86 is effective to shift the spool-type combined quick service and selector valve 94 in the direction of the left hand from its release position, in which it is shown in FIG. 1A, to a quick service position in which the outturned flange on the left-hand end of the spring seat 101 abuts the sectionalized casing 8, or, in other words, the left-hand end of the chamber 89, without effecting compression of spring 102. It will be noted that this movement of the valve 94 is very prompt because no resistance to movement is offered by the spring 102; only the friction of the O-rings 110 has to be overcome.

Upon movement of the spool-type combined quick service and selector valve 94 to its quick service position, passageway 114 will be cut off from passageway 115, thereby closing the control reservoir slow charging communication extending from the brake pipe 1 to the control reservoir 4 via pipe and passageway 29 (FIG. 1A) having therein the control reservoir slow charging choke 82 (FIG. 1A), chamber 173, passageway 81, peripheral annular groove 79 on the spool-type charging and quick service cut-off valve 76, passageways 80 and 114, elongated peripheral annular groove 105 on the spool-type combined quick service and selector valve 94, passageway 115, overcharge dissipation choke 116, counterbore 20 and passageway and corresponding pipe 21. The selector volume reservoir charging communication extending from the passageway 115 to the selector volume reservoir 5 via branch passageway 115a, interior of bottom bore 103, selector volume charging choke 104, branch passageway 90a and passageway and corresponding pipe 90 will also be closed upon movement of the spool-type combined quick service and selector valve 94 to its quick service position since the O-ring 110 adjacent the left-hand end of the elongated peripheral annular groove 105 will form a seal with the wall surface of the bottom bore 103 between the locations at which the selector volume charging choke 104 and the branch passageway 115a open at the wall surface of the bottom bore 103. Since the passageway 115 is connected to the control reservoir 4 via overcharge dissipation choke 116, counterbore 20 and passageway and corresponding pipe 21, it is therefore apparent that the control reservoir 4 is now cut off from the selector volume reservoir 5.

Furthermore, in the quick service position of the spool-type combined quick service and selector valve 94, the O-ring 110 adjacent the right-hand end of the elongated peripheral annular groove 109 thereon will form a seal with the wall surface of the bottomed bore 103 at a location on the left-hand side of the opening of the one end of the passageway 117 at the wall surface of this bottomed bore. Since the chamber 89 is connected to the brake pipe 1 via the passageway 91, and the passageway and corresponding pipe 29, fluid under pressure will now flow from the brake pipe 1 and the chamber 89 along the stem 95 to the passageway 117, and thence via the quick service reduction choke 118 to the inner seated area of the flat disc-type valve 119. Fluid under pressure thus supplied to the inner seated area of the flat disc-type valve 119 is effective to unseat this valve from the annular valve seat 120 whereupon it flows therepast and thence through the passageway 121 to the quick service volume 84 (FIG. 1), which is open to atmosphere at this time via the passageway 83 having therein the quick service reduction choke 85, the left-hand end of bottomed bore 77 (FIG. 1), passageways 78 and 34, and insect excluder device 37, for effecting a rapid preliminary quick service reduction in brake pipe pressure of a chosen degree. When the quick service volume 84 is charged, fluid under pressure will continue to be released from the brake pipe 1 at a slower rate via the quick service volume 84, the quick service reduction choke 85, the passageways 83, 78 and 34, and insect excluder device 37 since the end of the passageway 83 opening at the wall surface of the bottomed bore 77 is open to the passageway 78 by the charging and quick service cut-off valve 76 which is in its charging position.

It will be noted that upon movement of the spool-type combined quick service and selector valve 94 to its quick service position, the O-ring 110, located adjacent the left-hand end of the elongated peripheral annular groove 109, is not moved to a position at the left hand of the location at which the end of the branch passageway 90b opens at the wall surface of the bottomed bore 103. Since the opposite end of the branch passageway 90b is connected to the passageway 90 which at one end opens into the chamber 88 and at the other end is connected to the pipe bearing the same numeral, which pipe is connected to the selector volume reservoir 5, it is therefore apparent that fluid under pressure in the chamber 88 and the selector volume reservoir 5 (which is at substantially the normal fully charged value of brake pipe pressure) is bottled up or trapped therein while the spool-type combined quick service and selector valve 94 occupies its quick service position.

Fluid under pressure vented from the brake pipe 1 and the chamber 89 to atmosphere via the quick service volume 84 and choke 85, while the spool-type combined quick service and selector valve 94 occupies its quick service position, will increase the differential of pressure on the diaphragm 86 until this differential of pressure is great enough to deflect the diaphragm 86 in the direction of the left hand against the yielding resistance of the spring 102. This deflection of the diaphragm 86 in the direction of the left hand is effective to shift the spool-type combined quick service and selector 94 in the same direction from its quick service position to a service position in which the outturned cup-like annular flange at the left-hand end of the sleeve-like strut 100 abuts the sectionalized casing 8 at the left-hand end of the chamber 89.

In this service position of the spool-type combined quick service and selector valve 94, the O-ring 110, located adjacent the left-hand end of the elongated peripheral annular groove 109, is in a position in which it makes a seal with the wall surface of the bottomed bore 103 intermediate the locations at which one end of the branch passageway 90b and one end of the passageway 113 open at the wall surface of the bottomed bore 103. Therefore, while the spool-type combined quick service and selector valve 94 occupies its service position, fluid under pressure will flow from the selector volume reservoir 5 and the chamber 88 at the right-hand side of the diaphragm 86 to the passageway 113 via the pipe and passageway 90, branch passageway 90b, elongated peripheral annular groove 109, the central bottomed bore 111 which has radial ports opening to the elongated peripheral annular grooves 109 and 107, and the elongated peripheral annular groove 107.

Fluid under pressure thus supplied to the passageway 113 will flow therefrom to the brake cylinder 2 (FIG. 1) via passageways 159 (FIG. 2) and 141, groove 139 on piston member 122, passageway 140, and passageway and corresponding pipe 41 (FIG. 1). Fluid under pressure will thus flow from the selector volume reservoir 5 and the chamber 88 on the right-hand side of diaphragm 86 to the brake cylinder 2 until the pressure in this reservoir and chamber has reduced to a value such that the reduced brake pipe pressure present in the chamber 89, together with the force of the spring 102, will exceed the fluid pressure force in the chamber 88 whereupon the diaphragm 86 will be deflected in the direction of the right hand to thereby move the combined quick service and selector valve 94 in this direction from its service position to a lap position in which the O-rings 110 carried by this valve 94 adjacent the respective opposite ends of the groove 108 thereon are disposed on the opposite sides of that end of the branch passageway 90b that opens at the wall surface of the bottomed bore 103 to thereby close communication between the branch passageway 90b and the passageway 113 and prevent further flow of fluid under pressure from the selector volume reservoir 5 and chamber 88 to the brake cylinder 2.

From the foregoing, it is apparent that when a service brake application is effected the combined quick service and selector valve device 12 of the brake control valve device 6 operates to supply fluid under pressure from the selector volume reservoir 5 and the chamber 88 on the right hand side of diaphragm 86 to the brake cylinder 2 until the pressure in the selector volume reservoir 5 is reduced to a value substantially equal to the reduced brake pipe pressure obtained in the brake pipe 1 and the chamber 89 on the left-hand side of the diaphragm 86 as the result of the engineer moving the handle of the brake valve on the locomotive to the selected position in its service zone and the quick service reduction of the pressure in the brake pipe 1 obtained by operation of the combined quick service and selector valve device 12 it being noted that the amount of reduction of pressure thus obtained in the brake pipe 1 is entirely independent of and in no way dependent upon the normal charged brake pipe pressure.

Furthermore, in this lap position of the spool-type combined quick service and selector valve 94, the O-ring 110 adjacent the right-hand end of the elongated peripheral annular groove 105 makes a seal with the wall surface of the bottomed bore 103 at a location that is to the left of the location at which the end of the passageway 114 opens at the wall surface of this bottomed bore. Consequently, the passageway 114 is cut off from the passageway 115 to prevent charging of the control reservoir 4 and the selector volume reservoir 5 from the brake pipe 1 while the spool-type combined quick service and selector valve 94 is in its lap position.

The reduction in brake pipe pressure resulting from filling of the quick service volume 84 (FIG. 1) and the venting of fluid under pressure from the quick service volume 84 to atmosphere through the continuous quick service reduction choke 85, in the manner explained above, is effective to hasten the reduction in the pressure in the brake pipe 1 being effected by the engineer's operation of the automatic brake valve device on the locomotive. Consequently, the reduction in pressure thus effected in the brake pipe 1 is effective in the chamber 26 of the service valve device 10 of the brake control valve device 6. Therefore, the higher pressure in the chamber 18, which pressure is the same as that in the control reservoir 4, will deflect the diaphragm 16 in an upward direction against the yielding resistance of the spring 43, since upward deflection of the diaphragm 16 is transmitted to the diaphragm 17 via the pusher stem 30, and cause the upper end of the stem 44 to first contact the bottom face of the flat disc-type valve 59 to close communication between the interior of the bore 45 and atmosphere via counterbore 63, radial port 64, peripheral annular groove 65, and passageway 66. As the stem 44 continues to be moved upward, the flat disc-type valve 59 will be unseated from the annular valve seat 46. By unseating of the flat disc-type valve 59, fluid under pressure from the auxiliary reservoir 3 flows via pipe and passageway 60 to the chamber 54, thence past the annular valve seat 46 and through the bore 45 to the passageway 141 from whence it flows via the elongated peripheral annular groove 139 on the piston member 122, the passageways 140 and 41 and corresponding pipe 1 to the brake cylinder device 2 to provide a build-up of brake cylinder pressure therein.

Fluid under pressure supplied to the passageway 41 in the manner described above, also flows via the passageway 71 to the chamber 69 at the right-hand side of the diaphragm 67. Fluid under pressure thus supplied to the chamber 69 deflects the diaphragm 67 in the direction of the left hand against the yielding resistance of the spring 75 to move the charging and quick service valve 76 to a cut-off position in which communication is closed between passageways 81 and 80 to cut off charging of the control reservoir 4 and selector volume reservoir 5 from the brake pipe 1 so long as brake cylinder pressure is present in chamber 69, and in which communication is closed between the passageways 83 and 78 to terminate flow of fluid under pressure from the quick service volume 84 to atmosphere which terminates initial quick service activity.

Fluid under pressure supplied to the passageway 41 also flows to the chamber 36 to increase the pressure therein. This increase in pressure is effective to establish a force that acts in a downward direction on the upper side of diaphragm 17. Upon this force slightly exceeding the force acting upward on the diaphragm 16, as a result of the reduction of pressure in the chamber 26 caused by the brake pipe reduction, the valve stem 44 will be moved downward until the spring 62 acting through the piston 52 seats the flat disc-type valve 59 on the annular valve seat 46. This cuts off flow of fluid under pressure from the auxiliary reservoir 3 to the brake cylinder device 2.

Therefore, after the pressure of fluid in the brake pipe 1 becomes stabilized at a value determined by the position in its application zone to which the engineer moved the handle of the automatic brake valve device on the locomotive, the supply of fluid under pressure from the auxiliary reservoir 3 to the brake cylinder device 2 will be terminated, it being understood that the supply of fluid under pressure from the auxiliary reservoir on each of the other cars in the train to its corresponding brake cylinder device will be likewise terminated. This seating of the disc-type valve 59 on the annular valve seat 46 is effective to hold the desired pressure of fluid in passageway 141 and hence in the brake cylinder device 2.

Fluid under pressure supplied from the auxiliary reservoir 3 to the brake cylinder device 2 via the passageway 41 in the sectionalized casing 8 of the brake control valve device 6 flows from the passageway 41 via the branch passageway 41a to the chamber 124 below the cup-shaped cylindrical piston member 122 of the service brake cylinder limiting valve device 13. Whenever this pressure in the chamber 124 increases to a value sufficient to overcome the force of the spring 127, the piston member 122 is moved upward to cut off further flow of fluid under pressure from the auxiliary reservoir 3 through the brake control valve device 6 to the brake cylinder device 2. The value of the spring force of the spring 127 thus limits the maximum pressure delivered to the brake cylinder device 2 during a service brake application.

To effect the first step in a graduated release of the brakes to any degree and in any number of desired steps on the locomotive and all the cars in a train subsequent to a partial or full service brake application, the engineer will move the handle of the automatic brake valve device from whatever position it occupies in its service zone in the direction of its running position to a selected position in the service zone corresponding to the higher degree of pressure desired in the brake pipe 1, and therefore to the reduction in pressure to be effected in the brake cylinder device 2 on all the cars in the train.

As the handle of the automatic brake valve device is thus moved from whatever position it occupied in its service zone in the direction of its running position to the selected position in its service zone, this brake valve device operates to effect the supply of fluid under pressure to the brake pipe extending from car to car in the train to cause an increase of pressure therein. As the pressure in the brake pipe is then increased, the brake control valves on these cars are operated thereby to effect a release of the brakes.

Fluid under pressure supplied to the brake pipe 1 will flow via pipe and corresponding passageway 29, and passageway 91 to the chamber 89 at the left-hand side of the diaphragm 86. As the pressure in the chamber 89 increases in response to the supply of fluid under pressure thereto from the brake pipe 1, a differential of pressure will be established on the opposite sides of the diaphragm 86 which acts in the direction of the right hand, as viewed in FIG. 1A of the drawings. When a differential of pressure of .6 pound per square inch is thus established on the opposite sides of the diaphragm 86, it is effective to deflect the diaphragm 86 in the direction of the right hand and thereby shift the spool-type combined quick service and selector valve 94 from its lap position to its release position, in which it is shown in FIG. 1A.

It will be remembered that when the brake equipment was initially charged prior to effecting a service brake application, the control reservoir 4 was charged from the brake pipe 1 until the pressure in the control reservoir 4 was substantially the same as the normal fully charged pressure carried in the brake pipe 1, which, for example, may be from 70 to 110 pounds per square inch inclusive. Since no reduction in pressure (except for possible leakage) occurred in the control reservoir 4 upon effecting a service brake application, when the spool-type combined quick service and selector valve 94 is shifted from its lap position back to its release position, fluid under pressure will flow from the control reservoir 4 to the selector volume reservoir 5 via pipe and corresponding passageway 21, counterbore 20, overcharge dissipation choke 116, passageway 115, branch passageway 115a, interior of bottomed bore 103, selector volume charging choke 104, branch passageway 90a and passageway and corresponding pipe 90. Since one end of the passageway 90 opens into the chamber 88, fluid under pressure supplied from the control reservoir 4 to the selector volume reservoir 5 also flows to the chamber 88 at the right-hand side of the diaphragm 86. Fluid under pressure is therefore supplied from the control reservoir 4 to the chamber 88 simultaneously as fluid under pressure is supplied from brake pipe 1 to the chamber 89 as the handle of the automatic brake valve device is moved toward the hereinbefore-mentioned selected position in its service zone. Upon the handle reaching this selected position, no further increase in pressure in the brake pipe 1 and the chamber 89 will occur. Consequently, the fluid under pressure supplied from the control reservoir 4 to the chamber 88 will establish a differential of pressure on the opposite sides of the diaphragm 86 which acts in the direction of the left hand and is effective to deflect the diaphragm 86 in this direction to shift the spool-type combined quick service and selector valve 94 from its release position back to its lap position to cut off further flow of fluid under pressure from the control reservoir 4 to the selector volume reservoir 5 and the chamber 88.

Fluid under pressure supplied to the brake pipe 1 will also flow via the pipe and passageway 29 to the chamber 26 of the service valve device 10. Consequently, fluid under pressure will build up in the chamber 26 above the diaphragm 16 as the engineer on the locomotive moves the handle of the automatic brake valve device to the selected position in the service zone simultaneously as pressure is reduced in the chamber 18 below the diaphragm 16 by the flow of fluid under pressure from the control reservoir 4 to the selector volume reservoir 5 and the chamber 88. Upon the handle of the engineer's automatic brake valve device reaching the selected position, the brake valve device operates to cut off flow of fluid under pressure to the train brake pipe extending from car to car through the train.

It will be rememberer that when the brake application was effected, fluid under pressure was supplied to the chamber 36 until the force of this fluid under pressure acting downward on the diaphragm 17 balanced the upward force, due to the difference in the pressure in the chamber 26 and the chamber 18 acting upward on the diaphragm 16 and valve stem 44 via the pusher stem 30. Therefore, when pressure in the chamber 26 is increased by a supply of fluid under pressure thereto from the brake pipe 1, this increase in the pressure in the chamber 26 will be effective to deflect the diaphragm 16 downward ad thereby render the spring 43 effective to move the stem 44 downward so that the upper end of the valve stem 44 is moved away from the lower side of the flat disc-type valve 59 which at this time is biased into contact with the annular valve seat 46 by the spring 62 acting through the piston 52. As the upper end of the valve stem 44 is thus moved downward away from the lower side of the flat disc-type valve 59, the brake cylinder device 2 is vented to atmosphere via pipe and passageway 41, passageway 157, ports 156, bore 153, past disc-type valve 155, counterbore 162, chamber 158, passageway 159, passageway 141, interior of bore 45, counterbore 63, port 64, peripheral annular groove 65 on the stem 44, and the passageway 66 having therein a brake cylinder release choke 193 which controls the rate at which fluid under pressure is released from the brake cylinder device 2.

Chamber 36 has one end of the passageway 41 opening thereinto, and one end of the passageway 71 is connected to the passageway 41 the opposite end of which opens into the chamber 69. Therefore, fluid under pressure will be vented from the chambers 36 and 69 simultaneously as it is vented from the brake cylinder device 2 until the pressure in the chamber 36 is reduced to such a value that the downward pressure acting on the diaphragm 17 is slightly less than the difference in pressure in the chambers 18 and 26 acting upward on the diaphragm 16, so that this upward force is effective to move the stem 44 upward until the upper end of this stem is moved into contact with the bottom of the flat disc-type valve 59 to cut off flow of fluid under pressure from the brake cylinder device 2 and the chamber 36 to the atmosphere. It is therefore apparent that as the pressure in the chamber 26 of the service valve device 10 of the brake control valve device 6 increases in response to the pressure supplied thereto from the brake valve device on the locomotive via the brake pipe 1, the service valve device 10 will operate to reduce the pressure in the brake cylinder device 2 and the chambers 36 and 69 to a degree proportional to the increase in the pressure in the brake pipe 1 effected by movement of the handle of the automatic brake valve device from the position it occupied in its service zone in the direction of its running position to the selected position in its service zone corresponding to the degree of brake pipe pressure desired. It will be understood that the control valves on the cars in the train operate in response to an increase in brake pipe pressure to release the brakes on the corresponding cars.

To effect the second step, and each succeeding step of a graduated release of the brakes, the engineer will move the handle of the automatic brake valve device from the first selected position it occupies in its service zone in the direction of its running position to another selected position in its service zone corresponding to the higher degree of pressure desired in the train brake pipe and therefore the reduced pressure to be obtained in the brake cylinder device on each of the cars in the train.

As the handle of the brake valve device is thus moved in the direction of its running position to another selected position in its service zone, the pressure in the brake pipe 1 and the train brake pipe extending from car to car through the train will be increased in accordance with the amount of arcuate movement of the handle towards its running position whereupon the service valve device of the brake control valve devices on all the cars operate in the manner explained above to reduce the pressure in the corresponding brake cylinder devices and the chambers 36 and 69 of the brake control valve device 6 to a degree proportionate to the increase in the pressure effected in the train brake pipe.

In view of the above, it will be apparent that the engineer may, by moving the handle of the automatic brake valve device in steps towards its running position, effect in successive steps a reduction of the pressure in the chambers 36 and 69 in the brake control valve device 6 and the brake cylinder device 2 and in the corresponding brake cylinder device on the various cars in the train until this pressure is reduced to a low value.

When the engineer desires to effect the final step in the release of the brakes and, therefore, a complete release of fluid under pressure from the chambers 36 and 69 in the brake control valve device 6, the brake cylinder device 2, and the brake cylinder devices on all the cars in the train, he will move the handle of the automatic brake valve device on the locomotive to its running position to cause a supply of fluid under pressure to the brake pipe 1 and the train brake pipe extending from car to car through the train for effecting the charging of the brake equipment on the cars in the train, in the manner described in detail under initial charging.

From the foregoing, it is apparent that the engineer, by manipulating the handle of the automatic brake valve device on the locomotive, can, by a series of successive steps, partially and then finally fully restore the pressure in the brake pipe 1 and the train brake pipe to correspondingly effect in steps the partial graduated and then finally a complete release of the brakes on the cars in the train.

It may be noted that upon substantial complete release of fluid under pressure from the brake cylinder device 2, and likewise from the chamber 69 of the combined charging and quick service valve device 11, the spring 75 will return the charging and quick service cut-off valve 76 to the position in which it is shown in FIG. 1A of the drawings upon the pressure in the chamber 69 being reduced to a low value which, for example, may be two pounds per square inch. It will be further noted that upon the pressure in the brake pipe being charged to its normal charged value, the pressure in the chamber 89 will likewise be charged to this same value to cause the diaphragm 86 to be deflected in the direction of the right hand and thereby shift the spool-type combined quick service and selector valve 94 from its lap position to its release position, in which it is shown in FIG. 1A of the drawings. Upon the charging and quick service cut-off valve device 76 and the spool-type combined quick service and selector valve 94 being returned to the respective positions, in which they are shown in FIG. 1A, the control reservoir 4 and the selector volume reservoir 5 will be fully charged from the brake pipe 1 via the charging and quick service cut-off valve device 76 and the spool-type combined quick service and selector valve 94, in the manner hereinbefore described in detail.

To effect an emergency application of the brakes, the handle of the automatic brake valve device on the locomotive will be moved to its emergency position to cause a rapid reduction at an emergency rate in the pressure in the train brake pipe extending from the locomotive back through the cars in the train until the pressure in the brake pipe 1 and the train brake pipe is reduced to zero or atmospheric pressure. Such reduction in brake pipe pressure will occur in chamber 89 (FIG. 1A) of the combined quick service and selector valve device 12 of the brake control valve device 6 since the chamber 89 is connected to the brake pipe 1 via passageways 91 and passageway and corresponding pipe 29. When brake pipe pressure has been reduced a slight degree such as the hereinbefore-mentioned 0.8 pound per square inch in the chamber 89, the spool-type combined quick service and selector valve 94 will be shifted directly and quickly from its release position to its service position to (1) cut off communication between the brake pipe 1 and the control reservoir 4 and the selector volume reservoir 5 and (2) cut off the selector volume reservoir 5 from the control reservoir 4 and bottle up the fluid under pressure in these reservoirs.

When the combined quick service and selector valve 94 is shifted to its service position, the selector volume reservoir 5 and the chamber 88 are connected to the passageway 113.

Fluid under pressure thus supplied to the passageway 113 will flow therefrom to the brake cylinder device 2 via the pathway hereinbefore described. Since the brake pipe pressure has been reduced to atmospheric pressure as the result of the engineer moving the brake valve handle of the brake valve device to its emergency position, it will be understood that the pressure in the chamber 89 is likewise reduced to atmospheric pressure. Consequently, the combined quick service and selector valve 94 is not moved back to its lap position in the manner hereinbefore described in connection with effecting a service brake application.

From the foregoing, it is apparent that when an emergency brake application is effected, (1) the combined quick service and selector valve 94 is quickly moved to its service position to trap the fluid under pressure in the control reservoir 4, (2) the brake pipe pressure in the chamber 89 at the left-hand side of the diaphragm 86 is reduced to zero or atmospheric pressure, and (3) the chamber 88 at the right-hand side of the diaphragm 86 and the selector volume reservoir 5 is connected to the brake cylinder 2 so that fluid under pressure will begin to flow from the chamber and reservoir of the brake cylinder.

The reduction in brake pipe pressure effected by movement of the handle of the automatic brake valve device to its emergency position is effective to cause the service valve device 10 of the brake control valve device 6 to operate in the manner hereinbefore described to effect the supply of fluid under pressure from the auxiliary reservoir 3 to the brake cylinder device 2.

It will be noted that when an emergency brake application is effected and brake pipe pressure is reduced to zero or atmospheric pressure, fluid under pressure acting above the larger piston of the differential piston member 142 is likewise reduced to atmospheric pressure since the upper side of this larger piston is connected to the brake pipe 1 via ports 29b, branch passageway 29a and passageway and corresponding pipe 29. Therefore, spring 147 is rendered effective to move the differential piston member 142 and the stem 152 upward to the position in which they are shown in FIG. 1A to effect unseating of the flat disc-type valve 155 against the yielding resistance of the spring 161 from its annular valve seat 154. While the flat disc-type valve 155 is unseated, the passageway 141 is connected to the passageway 41 via the passageway 159, chamber 158, counterbore 162, past annular valve seat 154, bore 153, counterbore 144, ports 156 in bushing 145 and passageway 157 in bypass of the service brake cylinder limiting valve device 13. Therefore, fluid under pressure can flow from the auxiliary reservoir 3 to the brake cylinder device 2 in bypass of the service brake cylinder limiting valve device 13 until brake cylinder pressure acting within the counterbore 144 above the smaller piston of the differential piston member 142 has increased sufficiently to overcome the force of the emergency limiting valve spring 147 and move the differential piston member 142 downward against the yielding resistance of the spring 147 to thereby render the spring 161 effective to move the flat disc-type valve 155 into seating contact with the annular valve seat 154 which cuts off further flow of fluid under pressure from the auxiliary reservoir 3 to the brake cylinder device 2. It is therefore apparent from the foregoing that when an emergency brake application is effected, brake cylinder pressure is limited by the operation of the emergency brake cylinder limiting valve device 14 which is connected in bypassing relation to the service brake cylinder limiting valve device 13 and which provides for obtaining a higher brake cylinder pressure than when effecting a service brake application.

It will be understood, of course, that the combined charging and quick service cut-off valve device 11 is operated by the fluid under pressure supplied to the brake cylinder device 2 when effecting an emergency brake application in the same manner as when a service brake application is effected.

It will be noted from FIG. 1A of the drawings that the passageway 113 is connected to the passageway 159 intermediate the ends thereof and that one end of this passageway 159 is connected to the passageway 141 and the other end opens into the chamber 158. Consequently, it will be understood that the fluid under pressure supplied to the passageway 113 upon operation of the combined quick service and selector valve device 12 flows to the brake cylinder 2 until the subsequent operation of the service valve device 10 effects the supply of fluid under pressure from the auxiliary reservoir 3 to the passageways 141 and 159 and thence to the brake cylinder device 2, whereupon fluid under pressure flows from the passageway 159 to the selector volume reservoir 5 via passageway 113, groove 107, bottomed bore 111, groove 109 (it being remembered, valve 94 is now in its service or third position), branch passageway 90b, and passageway and pipe 90 until the service valve device 10 is moved to its lap position to cut off further flow of fluid under pressure from the auxiliary reservoir 3 to the passageways 141 and 159. Accordingly, the pressure in the selector volume reservoir 5 and the chamber 88 is increased simultaneously as the pressure in the brake cylinder 2 is increased and the same pressure is obtained in the brake cylinder 2, the selector volume reservoir 5 and the chamber 88 when an emergency brake application is effected. Therefore, the pressure obtained in the selector volume reservoir 5 and chamber 88 subsequent to an emergency brake application is always proportional to the original fully charged pressure in the train brake pipe. Consequently, it is not necessary to change check valve springs when a car provided with a brake control valve device 6 is subsequently hauled in a train having a different brake pipe pressure from that of a train from which this car has been previously set off on a siding since the brake control valve device 6 has no spring-loaded check valve device such as that provided in heretofore used brake control valve devices to limit the pressure retained in the selector volume reservoir when a brake application is effected.

In addition to moving the handle of the engineer's brake valve device to its emergency position, an emergency brake application can be obtained in response to an adverse signal indication, overspeed of the train, the engineer becoming incapacitated or the manual operation of a conductor's or emergency brake valve device to cause operation of the vent valve of the brake valve device to effect venting of fluid under pressure from the train brake pipe at an emergency rate.

Let it be assumed that an emergency brake application has been effected as the result of an adverse signal indication, overspeed of the train, the engineer becoming incapacitated or manual operation of an emergency brake valve device.

Before the train can proceed, subsequent to the above-mentioned emergency brake application, it is necessary that the engineer move the handle of the brake valve device from its running position to its suppression position.

Movement of the handle of the brake valve device to its suppression position effects operation of the suppression valve of the brake valve device to cause the supply of fluid under pressure to the so-called lock-over pipe from whence it flows to the suppression valve of the brake application valve device (not shown) to cause movement of the brake application valve from its application position to its release position.

This movement of the handle to its suppression position also effects operation of the regulating valve of the brake valve device to supply fluid under pressure via the application valve now in its release position to the relay valve of the brake valve device to cause operation of this relay valve to provide in the train brake pipe a pressure corresponding to the pressure obtained in the train brake pipe when a full service brake application is effected. Accordingly, upon movement of the handle of the brake valve device to its suppression position, fluid under pressure is supplied to the brake pipe 1, the chamber 26 of the service valve device 10, and the chamber 89 of the combined quick service and selector valve device 12 to increase the pressure therein until the pressure corresponds to the pressure obtained in the train brake pipe when a full service brake application is effected.

The above-mentioned build-up of pressure in the chamber 26 of the service valve device 10 causes operation of this valve device to begin the release fluid under pressure from the brake cylinder 2, the selector volume reservoir 5 and the chamber 88 which reservoir and chamber are connected to the brake cylinder 2 since the combined quick service and selector valve 94 is now in its service position in which a communication is established between branch passageway 90b of passageway 90 and the passageway 113.

From the foregoing, it is apparent that the pressure in the chamber 89 is increasing and the pressure in the chamber 89 on the opposite side of the diaphragm 86 is decreasing. This continues until the pressures in chambers 88 and 89 on opposite sides of the diaphragm 86 are equal whereupon the spring 102 moves the combined quick service and selector valve 94 from its third or service position back to its lap position in which the outturned flange on the left-hand end of the spring seat 101 abuts the sectionalized casing 8 at the left-hand end of the chamber 89 and the inturned flange on the right-hand end of this spring seat 101 abuts the outturned cup-like flange at the left-hand end of the strut 100.

As hereinbefore described, in this lap position of the combined quick service and selector valve 94, communication is closed between branch passageway 90b and the passageway 113 so that the selector volume reservoir 5 is cut off from the brake cylinder 2. Also, in this lap position of the combined quick service and selector valve 94, the O-ring 110 carried by this valve 94 adjacent the left-hand end of the groove 105 thereon forms a seal with the wall surface of the bottomed bore 103 at a location at the left-hand side of the location at which the branch passageway 115a opens at the wall surface of this bottomed bore 103. Consequently, communication between the selector volume reservoir 5 and the control reservoir 4 remains closed so that equalization of pressure between these reservoirs cannot occur. Should such equalization occur, the pressure in the control reservoir 4 would be reduced by flow of fluid under pressure therefrom into the selector volume reservoir 5. This reduction of pressure in the control reservoir 4 would cause a corresponding reduction in the pressure in the chamber 18 of the service valve device 10 which valve device would operate in response to this reduction of pressure in the chamber 18 to effect a corresponding reduction of pressure in the brake cylinder 2 which would be undesirable at this time. Accordingly, from the foregoing, it is apparent that upon manual movement of the handle of the engineer's brake valve device to its suppression position, the combined quick service and selector valve 94 is moved from its service to its lap position, and the service valve device 10 operates to reduce the pressure in the brake cylinder 2 until the pressure therein corresponds to that obtained when a full service brake application is effected.

The above-mentioned full service brake application can now be released by manually moving the handle of the brake valve device on the locomotive from its suppression position back to its running position. Upon movement of the handle of the brake valve device to its running position, the brake pipe 1 will be charged to its normal value. It will be noted that the fluid under pressure supplied to the brake pipe 1 will flow therefrom to the chamber 89 at the left-hand side of the diaphragm 86 via pipe and corresponding passageway 29 and passageway 91. Since the fluid in the chamber 88 at the right-hand side of the diaphragm 86 and in the selector volume reservoir 5 was trapped therein when the combined quick service and selector valve 94 was moved to its lap position, the supply of fluid under pressure from the brake pipe 1 to the chamber 89 is without effect until the pressure in the chamber 89 is increased above the trapped pressure in the chamber 88. Upon the pressure in the chamber 89 exceeding the pressure in the chamber 88, the diaphragm 86 will be deflected in the direction of the right hand to move the valve 94 from its lap position back to its release position shown in FIG. 1A.

Upon return of the combined quick service and selector valve 94 to its release position, fluid under pressure will flow from the fully charged (except for leakage) control reservoir 4 and the chamber 18 in the service valve device 10 to the selector volume reservoir 5 and chamber 88 until equalization of pressure therebetween occurs, it being noted that the control reservoir 4 is now connected to the selector volume reservoir 5 via pipe and corresponding passageway 21, counterbore 20, choke 116, passageway 115, branch passageway 115a, bottomed bore 103, choke 104, branch passageway 90a and passageway and corresponding pipe 90, and the chamber 18 is connected to the counterbore 20 via passageway 19.

At the same time as the pressure in the chamber 18 is decreasing by flow of fluid under pressure therefrom to the selector volume reservoir 5 in the manner just explained, fluid under pressure supplied to the brake pipe 1 is flowing therefrom to the chamber 26 in the service valve device 10 via pipe and corresponding passageway 29. Accordingly, it is seen that the pressure in the chamber 26 above the diaphragm 16 is increasing simultaneously as the pressure in the chamber 18 below this diaphragm is decreasing. Consequently, a fluid pressure force acting on the diaphragm 16 in a downward direction is quickly established and this force operates the service valve device 10 to effect release of fluid under pressure from the brake cylinder 2 to atmosphere to cause a complete release of the brakes on the car provided with the brake control valve device 6. The brake control valve devices on the other cras in the train operate in response to charging the train brake pipe to effect a release of the brakes on these cars.

If an enemergency application of the brakes on the cars in the train has been effected by moving the handle of the brake valve device on the locomotive to its emergency position and leaving it in this position until the pressure in the train brake pipe has been reduced to atmospheric pressure and the brake control valve device on each car in the train has operated in response to the reduction of the pressure in the train brake pipe at an emergency rate to effect an emergency brake application on the respective car, this emergency brake application can be subsequently released by the engineer moving the handle of the brake valve device on the locomotive from its emergency position to its running position to effect the supply of fluid under pressure to the train brake pipe at the usual normal rate. The fluid under pressure thus supplied to the brake pipe 1 will flow therefrom to the chamber 89 at the left-hand side of the diaphragm 86 of the combined quick service and selector valve device 12 via pipe and corresponding passageway 29 and passageway 91. Since the fluid in the chamber 88 at the right-hand side of the diaphragm 86 and in the selector volume reservoir 5 is at the same pressure as that in the brake cylinder 2, the supply of fluid under pressure from the brake pipe 1 to the chamber 89 is without effect until the pressure in this chamber is substantially equal to the pressure in the chamber 88.

When the emergency brake application was effected, the brake pipe pressure in the chamber 26 above the large diaphragm 16 of the service valve device 10 was reduced to zero or atmospheric, fluid under pressure was supplied from the auxiliary reservoir 3 to the brake cylinder 2, the chambers 36, 69 and 88, and the selector volume reservoir 5 until the emergency brake cylinder pressure limiting valve device 14 operated to cut off this flow while the pressure in the chamber 18 and in the control reservoir 4 remained (except for leakage) at the normal fully charged pressure.

Therefore, fluid under pressure supplied by the brake valve device to the brake pipe 1 will also flow to the chamber 26 above the diaphragm 16 via the pipe and corresponding passageway 29 to increase the pressure in the chamber 26 above atmosphere. Therefore, when the increasing brake pipe pressure in the chamber 26, together with the brake cylinder pressure present in the chamber 36 and acting on the upper side of the small diaphragm 17, and the force of the spring 43, establishes a force acting in a downward direction on the diaphragm 16 that exceeds the upward force established thereon by the control reservoir pressure present in the chamber 18, the diaphragm 16 will be deflected downward whereupon the service valve device 10 will operate in the manner hereinbefore described to begin the release fluid under pressure from the brake cylinder 2, the chamber 36 above the small diaphragm 17, the chamber 69 of the combined charging and quick service valve device 11, the selector volume reservoir 5 and chamber 88 at the right-hand side of the diaphragm 86 to atmosphere.

It will be noted that at this time the pressure in the chamber 89 at the left-hand side of the diaphragm is increasing as the result of the supply of fluid under pressure thereto from the brake pipe 1 via pipe and corresponding passageway 29 and the passageway 91, and the pressure in the chamber 88 at the right-hand side of this diaphragm is decreasing by flow therefrom to atmosphere in response to operation of the service valve device 10, as explained above. Accordingly, the pressure in the chamber 89 will quickly exceed the pressure in the chamber 88 whereupon this higher pressure in the chamber 89 and acting on the left-hand side of the diaphragm 86 will deflect this diaphragm in the direction of the right hand and moved the combined quick service and selector valve 94 from its service position back to its release position in which it is shown in FIG. 1A to thereby cut off further flow from the selector volume reservoir 5 and chamber 88 to atmosphere.

When the combined quick service and selector valve 94 is thus returned to its release position, equalization of pressure between the control reservoir 4, to which the chamber 18 in the service valve device 10 is connected via the pathway hereinbefore described, and the selector volume 5 occurs in the manner hereinbefore explained. This causes a reduction of pressure in the chamber 18 below the diaphragm 16 of the service valve device 10 simultaneously as the pressure in the chamber 26 above this diaphragm is increasing by the flow of fluid under pressure from the brake pipe 1 to this chamber to increase the pressure therein to the normal fully charged pressure in the brake pipe. Consequently, the service valve device 10 is quickly operated in the manner hereinbefore described to complete the release of all fluid under pressure from the brake cylinder 2 to atmosphere to cause a complete release of the brakes on the car.

When the pressure in the chamer 69 has been reduced by operation of the service valve device 10 to the hereinbeforementioned low value of, for example, two pounds per square inch, the spring 75 will shift the charging and quick service cut-off valve 76 from its cut-off position back to the charging position in which it is shown in FIG. 1A. Subsequent to the charging and quick service cut-off valve 76 being returned to its charging position, the control reservoir 4 and the selector volume reservoir 5 will be charged from the brake pipe 1, in the manner hereinbefore described, until the pressure in these reservoirs is the same as the fully charged brake pipe pressure.

The brake control valve device 6 can be conditioned for direct release operation by removing a cap 194, shown in FIG. 1A, from the sectionalized casing 8, turning it to another position in which it is shown in FIG. 2, and then securing it to the sectionalized casing 8 in any suitable manner (not shown). In this position of the cap 194, a passageway 195 therein establishes a communication between a branch passageway 81a of the passageway 81 and the pasageway 80.

Since the combined quick service and selector valve device 12 operates in the same manner to supply fluid under pressure from the selector volume reservoir 5 to the brake cylinder 2 when the brake control valve device 6 is conditioned for direct release operation, as it operates when the brake control valve device 6 is conditioned for graduated release operation, a detailed description of the operation of this valve device 6 for direct release operation is not deemed necessary to an understanding of the present invention.

Presently used brake control valve devices of the No. 26 type may be modified to operate in the same manner as that hereinbefore described for the brake control valve device 6 by:

(1) Removing the selector volume overcharge check valve device and plugging the passageway in the body of the control valve device that presently leads to this check valve device, and (2) Providing a communication through which fluid under pressure may flow from the selector volume reservoir to the brake cylinder upon movement of the combined quick service and selector valve device to its service position by the approximate drilling of a single hole in the body casting of these control valve devices to connect two parallel passageways presently in these body castings.

Having now described the invention, what we claim as new and desire to secure by Letters Patent, is:

1. In a fluid pressure brake system for a railway car, the combination of:
    (a) a brake pipe normally charged to a certain chosen pressure,
    (b) fluid pressure operated braking means for effecting a brake application on the car,
    (c) a source of fluid under pressure,
    (d) a selector volume reservoir normally charged with fluid at said certain chosen pressure, and
    (e) a brake control valve device having:
        (i) a service valve device responsive, respectively, to a reduction in brake pipe pressure from said certain chosen pressure to effect the supply of fluid under pressure from said source of fluid under pressure to said braking means and to restoration toward said certain pressure in the brake pipe to effect a release of fluid under pressure from said braking means to atmosphere, wherein the improvement comprises:
        (ii) selector valve means controlling a charging communication through which fluid under pressure may normally flow from the brake pipe to the selector volume reservoir, and two release communications of different flow capacities via one of which fluid under pressure may be released from the brake pipe to atmosphere at a relatively slow rate and via the other of which fluid under pressure may be released from the selector volume reservoir to said braking means at a faster rate,
        (iii) said selector valve means being subject opposingly to brake pipe pressure and selector volume reservoir pressure and responsive to an initial reduction in brake pipe pressure to below selector volume reservoir pressure at any rate to close said charging communication and open only that one of said release communications through which fluid under pressure may be released from said brake pipe to atmosphere,
        (iv) said selector valve means being further responsive to a reduction in brake pipe pressure effected consequent to flow to atmosphere via the open one of said two release communications to effect opening of the other of said two release communications through which fluid under pressure may be released from said selector volume reservoir to said braking means, and
        (v) said service valve device being responsive to the reduction in brake pipe pressure from said certain chosen pressure to effect the supply of fluid under pressure from said source of fluid under pressure to said braking means and to said selector volume reservoir to limit the reduction in pressure in said selector volume reservoir and thereafter to increase the pressure therein and in said braking means to a degree corresponding to the degree of reduction of pressure in said brake pipe.

2. A fluid pressure brake system for a railway car, as claimed in claim 1, further characterized in that the other of said two release communications includes conduit means interconnecting two ports, the supply of fluid under pressure from said selector volume reservoir to one of said ports being effected by operation of said selector valve means in response to the consequent reduction in brake pipe pressure effected by flow to atmosphere via the open one of said two release communications, and the supply of fluid under pressure from said source of fluid under pressure to the other of said ports being effected by operation of said service valve device in response to the reduction in brake pipe pressure from said certain chosen pressure.

3. A fluid pressure brake system for a railway car, as claimed in claim 2, further characterized in that said brake system comprises a control reservoir charged to a constant pressure corresponding to said certain chosen pressure in said brake pipe, and in that said service valve device has an operating abutment subject in opposing relation to the constant pressure in said control reservoir and the pressure in said brake pipe whereby said service valve device is operative by said abutment responsive to varying reductions of pressure in said brake pipe from said certain chosen pressure relative to the opposing constant pressure in said control reservoir for effecting the supply of fluid under pressure from said source of fluid under pressure to said braking means and to said selector volume reservoir, while said selector valve means effects opening of the other of said two release communications, whereby, subsequent to flow of fluid under pressure from said selector volume reservoir to said braking means, the pressure in said braking means and in said selector volume reservoir is increased to a value corresponding to the reduction of pressure effected in said brake pipe, said service valve device being operative by said abutment upon an increase in pressure in said brake pipe toward the opposing constant pressure in said control reservoir for effecting a corresponding release of fluid under pressure from said braking means to atmosphere, and said selector valve means being operative by said increase in pressure in said brake pipe to close said two release communications and establish said charging communication.

4. A fluid pressure brake system for a railway car, as claimed in claim 3, further characterized in that said selector valve means controls a second charging communication through which fluid under pressure may normally flow from said brake pipe to said control reservoir, and in that said selector valve means is operative responsively to an initial reduction in brake pipe pressure to simultaneously close both of said charging communications.

5. A fluid pressure brake system for a railway car, as claimed in claim 4, further characterized in that said selector valve means comprises a fluid pressure responsive abutment means subject opposingly to brake pipe pressure and selector volume reservoir pressure, said abutment means being responsive to an initial reduction in brake pipe pressure, at any rate, below selector volume reservoir pressure to cause said selector valve means to close both of said charging communications and open only that one of said release communications through which fluid under pressure may be released from said brake pipe to atmosphere, said abutment means being further responsive to a consequent reduction in brake pipe pressure effected by flow of fluid under pressure from said brake pipe to atmosphere via the open one of said two release communications to cause said selector valve means to effect opening of the other of said two release communications through which fluid under pressure may flow from said selector volume reservoir to said braking means until the operation of said service valve device increases the pressure in said braking means to a value substantially equal to the reduced pressure in said selector volume reservoir.

6. A fluid pressure brake system for a railway car, as claimed in claim 3, further characterized by limiting valve means responsive to complete venting of all fluid under pressure from said brake pipe and disposed so as to limit the pressure supplied to said braking means by operation of said service valve device whereby said service valve device is rendered operative to increase the pressure in said selector volume reservoir to a value in excess of that in said braking means.

7. A fluid pressure brake system for a railway car, as claimed in claim 3, further characterized by limiting valve means responsive to complete venting of all fluid under pressure from said brake pipe and disposed so as to limit the pressure supplied to said braking means by operation of said service valve device whereby said service valve device is rendered operative to increase the pressure in said selector volume reservoir until equalization of pressure occurs between said source of fluid under pressure and said selector volume reservoir.

References Cited

UNITED STATES PATENTS

| | | | |
|---|---|---|---|
| 3,018,138 | 1/1962 | Wilson et al. | 303—36 |
| 3,272,565 | 9/1966 | Wilson | 303—8 |

DUANE A. REGER, Primary Examiner

U.S. Cl. X.R.

303—8